J. STANGL.
HEATER FOR STITCHING MACHINES.
APPLICATION FILED OCT. 22, 1919.

1,428,717.

Patented Sept. 12, 1922.

Inventor
Joseph Stangl,
By Morsell + Keeney
Attorneys.

Patented Sept. 12, 1922.

1,428,717

UNITED STATES PATENT OFFICE.

JOSEPH STANGL, OF WEST BEND, WISCONSIN.

HEATER FOR STITCHING MACHINES.

Application filed October 22, 1919. Serial No. 332,464.

*To all whom it may concern:*

Be it known that I, JOSEPH STANGL, a citizen of the United States, and resident of West Bend, in the county of Washington and State of Wisconsin, have invented new and useful Improvements in Heaters for Stitching Machines, of which the following is a description, reference being had to the accompanying drawings, which are a part of this specification.

The present invention relates to certain new and useful improvements in heaters and refers more particularly to an electrical heater especially adapted for use in connection with shoe stitching or welting machines.

One object of the present invention is to provide an electrical heater of the class described, having two heating elements separately connected with a source of power supply whereby they may be used either jointly or separately.

Another object of my invention is to provide a heating device having a base of iron, or other heat retaining substance, in which is embedded two or more heating elements connected with a source of supply and capable of use either jointly or independently A further object of my invention is to provide a heater of the class described, having a base member of heat retaining material encased within a container of heat insulating material such as asbestos or the like, and having an air space between the sides of the base member and the container.

A still further object of the present invention is to provide a heater of the class described especially adapted for use in connection with shoe stitching and welting machines for maintaining wax, or the like, in a liquid state for waxing the thread employed by the stitching machine.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing I have illustrated one complete example of the physical embodiment of my invention constructed according to the best mode I have so far devised for the practical application of the principles thereof, and in which.

Figure 1:
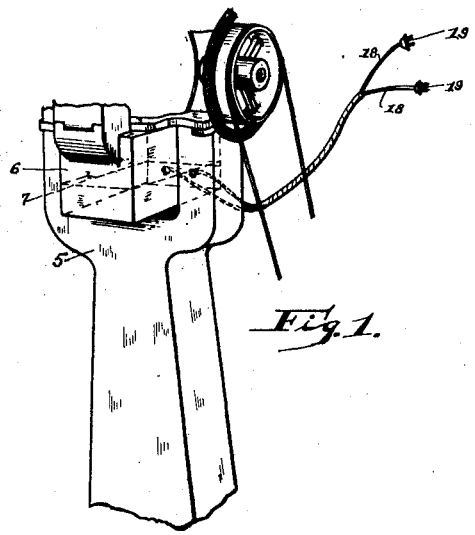
Fig. 1 is a perspective view of a portion of a shoe stitching or welting machine equipped with my invention.

Referring now more particularly to the accompanying drawing, the numeral 5 designates a shoe stitching or welting machine of any desired make or construction having a casing 6 in which is disposed the heating means for heating the wax and maintaining the same in a liquid condition. The novel form of heater which I employ comprises a container 7 of asbestos, or the like, and having its side and rear walls secured together by means of a U-shaped clip 8 and having its front end 9 secured to the side walls and the bottom by cement or any other desired means. It will be understood that the container 7 may be moulded in one piece or may be formed in any other desired manner.

Disposed within the container 7 is a base member 10 of iron or any other heat retaining material and the base member has its ends abutting the ends of the container 7 and its sides spaced from the sides of the container to provide an insulating air space 11 therebetween. The member 10 has two or more pockets or recesses 12 formed therein in each of which is removably mounted an electrical heating unit 13.

Each heating unit 13 includes a body of insulating material in which is embedded a resistance coil 14, having its ends 15 connected with two contact poles 16, which project outwardly from the front end of the heating element and through an adjacent opening 17 in the end 9 of container 7.

Each heating unit 13 is independently coupled with a suitable source of electrical supply by means of a feed wire 18 having one end 19 provided with a detachable connection for engagement with an electrical supply wire and its other end provided with a connecting plug or socket 20 for detachable engagement with the contact poles 16 of the heating unit.

Figure 2:
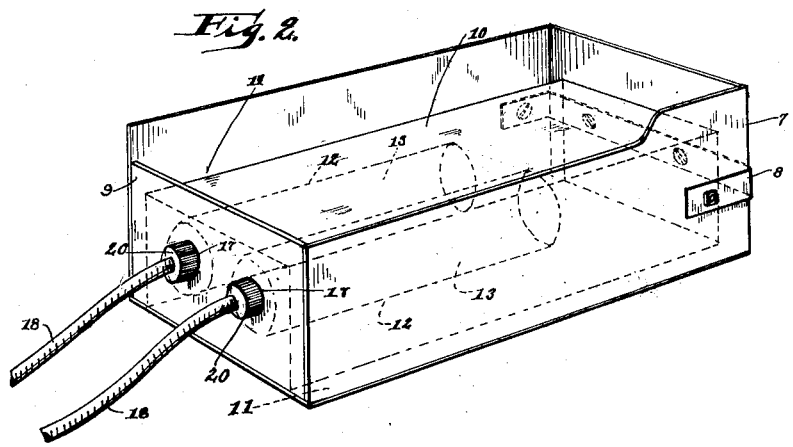
Fig. 2 is a perspective view of my novel form of heater detached from the stitching or welting machine.
Figure 3:
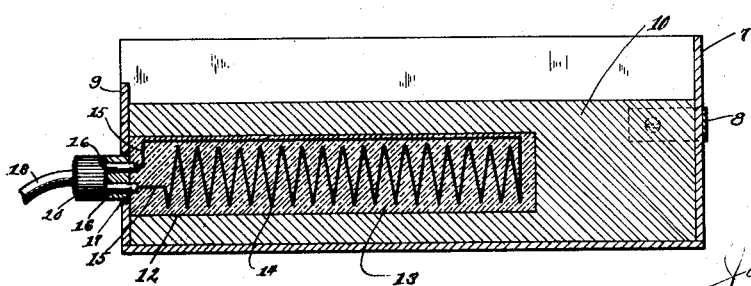
Fig. 3 is a longitudinal sectional view through the heating machine.

When it is desired to operate the stitching machine 5, both feed wires 18 are coupled with the source of electrical supply so that the resistance coils 14 will be heated, and impart their heat to the base member 10. The member 10 is made relatively thick and has considerable capacity for retaining heat. By operating all of the heating units, the wax which is disposed in a receptacle (not shown) placed upon the base member 10 will soon be reduced to a liquid state, and as the base member 10 will retain this heat for a long period of time, it is unnecessary to couple both heating elements and, therefore, but one is maintained in connection with the electrical supply wire. The end 9 and one of the side walls of the container 7 are cut away (see Figure 2) for convenience in placing the wax containing receptacle (not shown) upon the base member 10.

From the foregoing description taken in connection with the accompanying drawing, it will be at once apparent that I provide an electrical heater especially adapted in use for melting wax used in connection with shoe stitching or welting machines, which will be simple in construction and practical for the purpose described.

What I claim as my invention is:

1. A heating unit comprising a container, a base member disposed in said container and having large capacity for retaining heat, spaced substantially parallel pockets in said member, a heating element disposed in each pocket, and means independently connecting the heating elements with a source of power, whereby the heating elements may be singly or jointly employed to heat said member.

2. A heating unit comprising a container of heat insulating material, a base member disposed in said container and spaced from the side walls thereof to provide an air insulating space, said member having large capacity for retaining heat, a pocket in said member, and a heating element disposed in said pocket.

3. A heating unit comprising a container of heat insulating material, a base member disposed in said container and spaced from the side walls thereof to provide an air insulating space, a pocket in said member, said base member being formed of material possessing large capacity for retaining heat, a pair of spaced apart pockets in the base member, a heating element disposed in each pocket, and independent connections between the heating elements and a source of power, whereby both of said heating elements may be connected with the source of power at one time to substantially obtain the instant heating of the base member and one of the heating members then cut out to maintain the base member at the desired heat.

In testimony whereof, I affix my signature.

JOSEPH STANGL.